United States Patent
Kanivets

(10) Patent No.: US 9,519,404 B2
(45) Date of Patent: Dec. 13, 2016

(54) IMAGE SEGMENTATION FOR DATA VERIFICATION

(71) Applicant: ABBYY Development LLC, Moscow (RU)

(72) Inventor: Diana Kanivets, Moscow Region (RU)

(73) Assignee: ABBYY Development LLC (RU)

( * ) Notice: Subject to any disclaimer, the term of this patent is extended or adjusted under 35 U.S.C. 154(b) by 0 days.

(21) Appl. No.: 14/713,260

(22) Filed: May 15, 2015

(65) Prior Publication Data

US 2016/0216851 A1    Jul. 28, 2016

(30) Foreign Application Priority Data

Jan. 27, 2015 (RU) ................................ 2015102525

(51) Int. Cl.
| | | |
|---|---|---|
| G06K 9/34 | (2006.01) | |
| G06F 3/0482 | (2013.01) | |
| G06T 7/00 | (2006.01) | |
| G06K 9/18 | (2006.01) | |

(52) U.S. Cl.
CPC ............ *G06F 3/0482* (2013.01); *G06K 9/18* (2013.01); *G06T 7/0081* (2013.01); *G06T 2200/24* (2013.01)

(58) Field of Classification Search
CPC ..... G06F 17/27; G06K 2209/01; G06K 9/344; G06K 9/348; G06T 7/0081
USPC .................................................. 382/173, 177
See application file for complete search history.

(56) References Cited

U.S. PATENT DOCUMENTS

| | | | |
|---|---|---|---|
| 6,453,079 B1 | 9/2002 | McInerny et al. | |
| 7,111,255 B2 | 9/2006 | Zlotnick et al. | |
| 7,499,602 B2 | 3/2009 | Zlotnick et al. | |
| 7,930,642 B1* | 4/2011 | Gerde | H04N 1/40 382/312 |
| 9,082,080 B2* | 7/2015 | Schmidtler | |
| 9,286,534 B2* | 3/2016 | Zadeh | G06K 9/344 |
| 2006/0255124 A1* | 11/2006 | Hoch | G07F 19/00 235/380 |
| 2008/0080022 A1* | 4/2008 | Gogulapati | H04N 1/00962 358/487 |
| 2008/0279455 A1* | 11/2008 | Wall | G06K 9/6293 382/187 |
| 2009/0150169 A1* | 6/2009 | Kirkwood | G06Q 10/00 705/342 |

FOREIGN PATENT DOCUMENTS

WO    WO/2014/022919    2/2014

* cited by examiner

*Primary Examiner* — Kanjibhai Patel
(74) *Attorney, Agent, or Firm* — Veronica Weinstein

(57) ABSTRACT

Aspects of the present disclosure relate to image segmentation for data verification. A method of the disclosure comprises: receiving, using a processing device, an image of at least a part of a document; identifying a first image region in the image that corresponds to data to be verified by a user; extracting data from the image of at least the part of the document partitioning the image into a plurality of image segments based on positioning information related to the first image region, wherein the plurality of image segments comprises a first image segment and a second image segment, and wherein the second image segment comprises the first image region; and presenting data extracted from the first image region in association with the first image segment and the second image segment.

20 Claims, 12 Drawing Sheets

IMAGE SEGMENTATION FOR DATA VERIFICATION

CROSS REFERENCE TO RELATED APPLICATIONS

This application claims the benefit of priority to Russian Patent Application No. 2015102525, filed Jan. 27, 2015; disclosure of which is incorporated herein by reference in its entirety.

TECHNICAL FIELD

The embodiments of the disclosure relate generally to image processing and, more specifically, relate to image segmentation for data verification.

BACKGROUND

Conventional data recognition techniques use Optical Character Recognition (OCR) to convert a scanned image of a document (e.g., a form, an invoice, etc.) into computer-readable text. The task of data recognition generally involves a data verification process for improving the quality of recognition results. For example, recognition errors may be corrected in the verification process. As another example, text that cannot be recognized using the OCR technique may be added.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
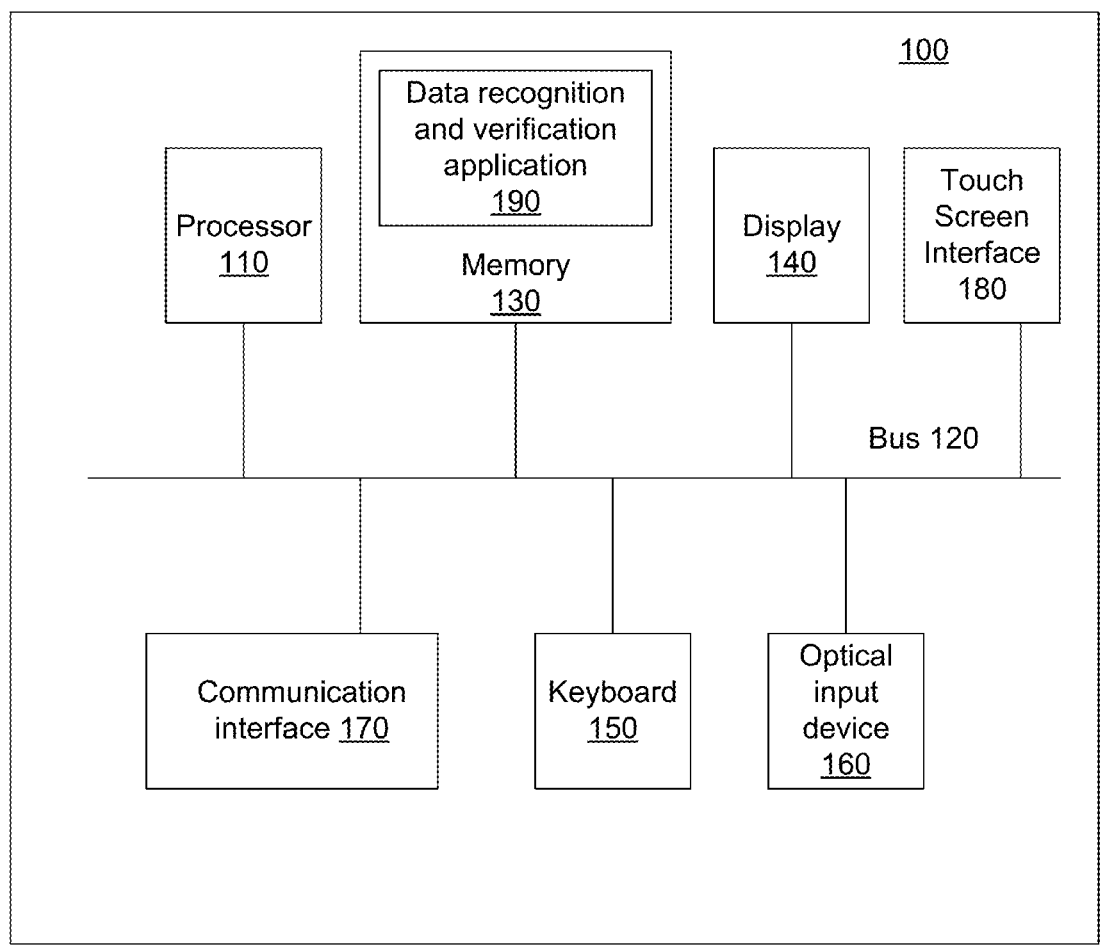
FIG. 1 is a block diagram of a computing device operating in accordance with an embodiment of the disclosure.

Described herein are methods and systems of image segmentation for data verification.

An optical character recognition (OCR) system may acquire an image of a paper document and transform the image into a computer-readable and searchable format comprising the textual information extracted from the image of the paper document. In various illustrative examples, an original paper document may comprise one or more pages, and thus the document image may comprise images of one or more document pages.

Sequences of characters, geometric structures (e.g., dividing lines, tables and/or other tabular structures, etc.), and/or any other data recognized by processing an image using an OCR technique may be subject to a data verification process. In the verification process, a user may confirm characters recognized using the OCR technique and/or correct characters that are not recognized correctly. For example, recognition errors may be corrected by a user during the verification process. As another example, unrecognized text may be entered by a user during the verification process. Because the user may have to process a huge amount of recognized data, the user's performance efficiency plays a key role in the verification process.

Current approaches for data verification present data that needs to be verified separately from the corresponding original image. As a result, the user may have to continuously compare the original image to recognized data extracted from the image for verification. As such, the user may have to continuously establish visual match of the recognized data to the corresponding original data in the image. In order to break the monotony of the user's work, the comparison may be organized in such a way as to have the recognized data displayed on an electronic screen concurrently with the original image. However, the user would still be shifting his/her gaze from the recognized data to the original image in order to make sure that the recognized text matches the original text in the original document image.

Aspects of the present disclosure partition an image into multiple image segments for data verification. One or more of the image segments may include regions of the image that correspond to data to be verified by a user (also referred to herein as "image regions"). Data extracted from the image regions can be presented in display fields positioned between two image segments in a user interface. More particularly, for example, a display field including a value of data extracted from a given image region can be presented above a portion of an image segment including the image region. The display fields do not overlap the image segments presented in the user interface. The user can change values presented in the display fields upon comparing the values with data contained in the image regions presented below the display fields.

As such, aspects of the present disclosure allow a verification process to be conducted directly on the original image and relieve the user from the burden of continued visual comparison of the documents in order to verify the recognition result. The proposed verification technique increases the speed of the verification process and reduces the cognitive load on the user. Moreover, aspects of the present disclosure enable the user to review data to be verified and its associated contextual information in view of the proximity of a portion of the original image corresponding to the data.

FIG. 1 depicts a block diagram of an example of a computing device 100 operating in accordance with one or more aspects of the present disclosure. In illustrative examples, computing device 100 may be provided by various computing devices including a tablet computer, a mobile phone, a laptop computer, a desktop computer, etc.

Computing device 100 may comprise a processor 110 coupled to a system bus 120. Other devices coupled to system bus 120 may include memory 130, display 140 equipped with a touch screen input device 180, keyboard 150, optical input device 160, and one or more communication interfaces 170. The term "coupled" herein shall include both electrically connected and communicatively coupled via one or more interface devices, adapters and the like.

Processor 110 may be provided by one or more processing devices including general purpose and/or specialized processors. Memory 130 may comprise one or more volatile memory devices (for example, RAM chips), one or more non-volatile memory devices (for example, ROM or EEPROM chips), and/or one or more storage memory devices (for example, optical or magnetic disks). Optical input device 160 may be and/or include one or more cameras, scanners, barcode readers, and/or any other device that is capable of generating images of a document.

In some embodiments, computing device 100 may comprise a touch screen input device 180 represented by a touch-sensitive input area and/or presence-sensitive surface overlaid over display 140. An example of a computing device implementing aspects of the present disclosure will be discussed in more detail below with reference to FIG. 10.

In some embodiments, memory 130 may store instructions of a data recognition and verification application 190 for processing images for data recognition and verification. In one embodiment, application 190 may be implemented as a function to be invoked via a user interface of another application (e.g., a billing application, an accounting application, an electronic document editing application, etc.). Alternatively or additionally, application 190 may be implemented as a standalone application.

In an example, application 190 may acquire an image of a document (e.g., an invoice, a form, etc.). The image may be acquired using the optical input device 160 or any other device. The image may have any suitable format, such as PDF, JPEG, PNG, BMP, etc. The image may be represented by a data structure comprising multiple bit groups of pixels of a visual representation of one or more portions of the document.

Application 190 may process the acquired image using an optical character recognition (OCR) technique and/or any other suitable technique and transform the image into a computer-readable and searchable format comprising textual information extracted from the image of the document. Application 190 can include the OCR functionality or can be a separate program or module that utilizes the output of an OCR application.

Figure 4:
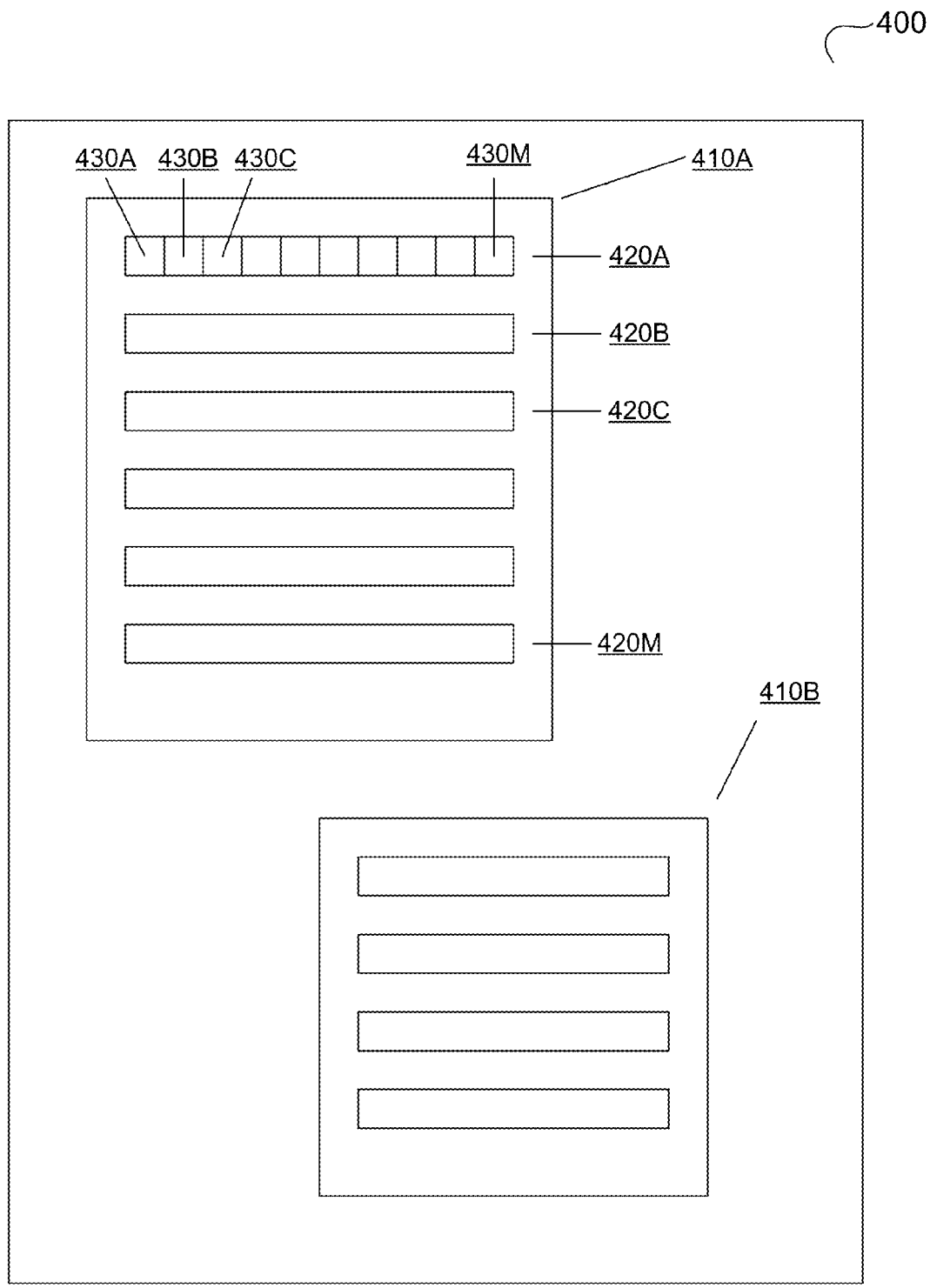
FIG. 4 illustrates an example of an image that may be processed by a data recognition and verification application according to an embodiment of the disclosure.

FIG. 4 illustrates an example of a document image 400 that may be processed by application 190 running on computing device 100 in accordance with one or more aspects of the present disclosure. Application 190 may analyze the image 400 to detect, within the image, one or more portions of the image comprising text blocks 410A-410B. The illustrated elements of the document layout have been selected for illustrative purposes only and are not intended to limit the scope of this disclosure in any way. Application 190 may further analyze each of 410A and 410B to detect a plurality of text lines 420A-420M. Within each portion of the image comprising a text line 420, application 190 may detect one or more image regions 430A-430M comprising sequences of characters delimited by whitespaces. Such a sequence of characters may represent, for example, a word comprising one or more letters, a number comprising one or more digits, etc. Application 190 may associate each of the sequences of characters with one or more data types, such as "character string," "numerical data," "integer," "decimal," etc.

Figure 5:
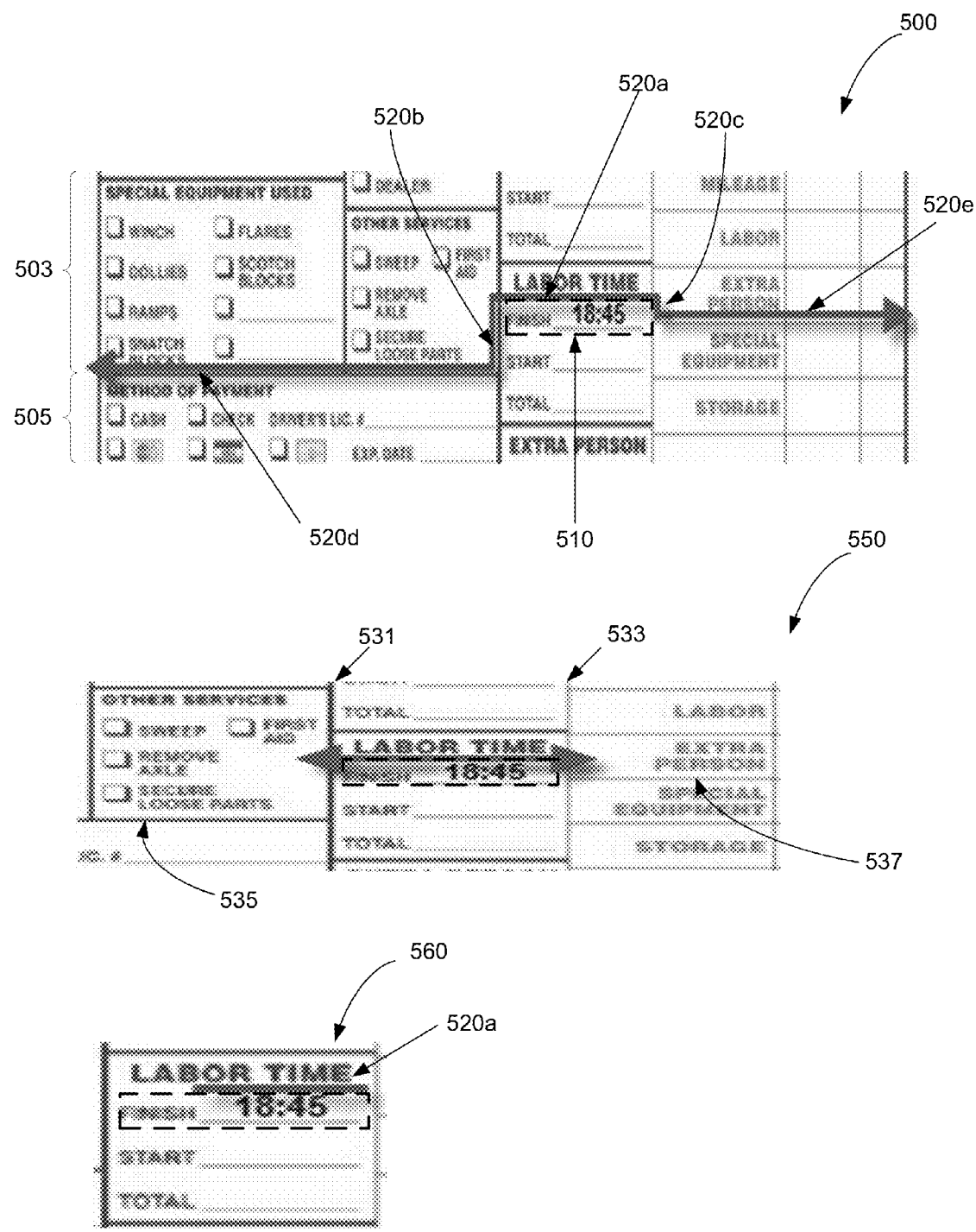
FIG. 5 illustrates examples of images subject to data verification according to an embodiment of the disclosure.

Application 190 may associate recognized sequences of characters containing related information with each other. For example, application 190 may associate a sequence of characters containing numerical data with a sequence of characters containing a description of the numerical data (e.g., a character string). In some implementations, two or more associated sequences of characters may be included in one image region. In a more particular example, as illustrated in FIG. 5, application 190 may process image 500 using an OCR technique and extraction techniques and identify an image region 510 corresponding to characters "18:45" and a description of the characters, i.e., "FINISH."

Additionally, application 190 can determine positioning extracted information related to image regions, geometric structures (e.g., dividing lines positioned between two or more recognized sequences of characters, tabular structures, etc.), and/or any other component of the image. For example, as shown in FIG. 4, image 400 may include image regions 430A-430M, and application 190 can detect boundaries of each image region 430 corresponding to extracted data using an OCR technique, an edge detection technique, and/or any other image processing technique or combination of techniques. As another example, for each image region 430, application 190 can determine one or more coordinates indicative of the location of the image region (e.g., coordinates associated with vertices of the image regions, coordinates associated with boundaries of the images regions, etc.). As yet another example, application 190 can detect one or more dividing lines (e.g. separators) located in the image and one or more coordinates associated with each of the dividing lines (e.g., as shown in FIG. 5, portion 550 of image 500 can include dividing lines 531, 533, 535, and 537).

Upon recognizing the sequences of characters and their corresponding image regions in the image, application 190 may extract the sequences of characters and/or any other data from the image regions. Application 190 may then associate the extracted data with their corresponding image regions.

Application 190 may also identify one or more of the recognized image regions that correspond to data (e.g., the recognized sequences of characters as described above) to be verified by a user. In one example, application 190 determines that an image region corresponds to data to be verified based on a confidence score corresponding to a degree of certainty or uncertainty with respect to the correctness of the data extracted from the image region. In a more particular example, application 190 may determine that the data extracted from the image region is to be verified in response to determining that the confidence score is not greater than a threshold.

In another example, application 190 determines that an image region corresponds to data to be verified in response to detecting one or more errors with respect to the data extracted from the image region. In a more particular example, the image region contains one or more symbols, characters, or any other type of data that cannot be recognized by application 190 and/or that cannot be recognized with a threshold degree of certainty (e.g., a threshold of confidence score).

Figure 9:
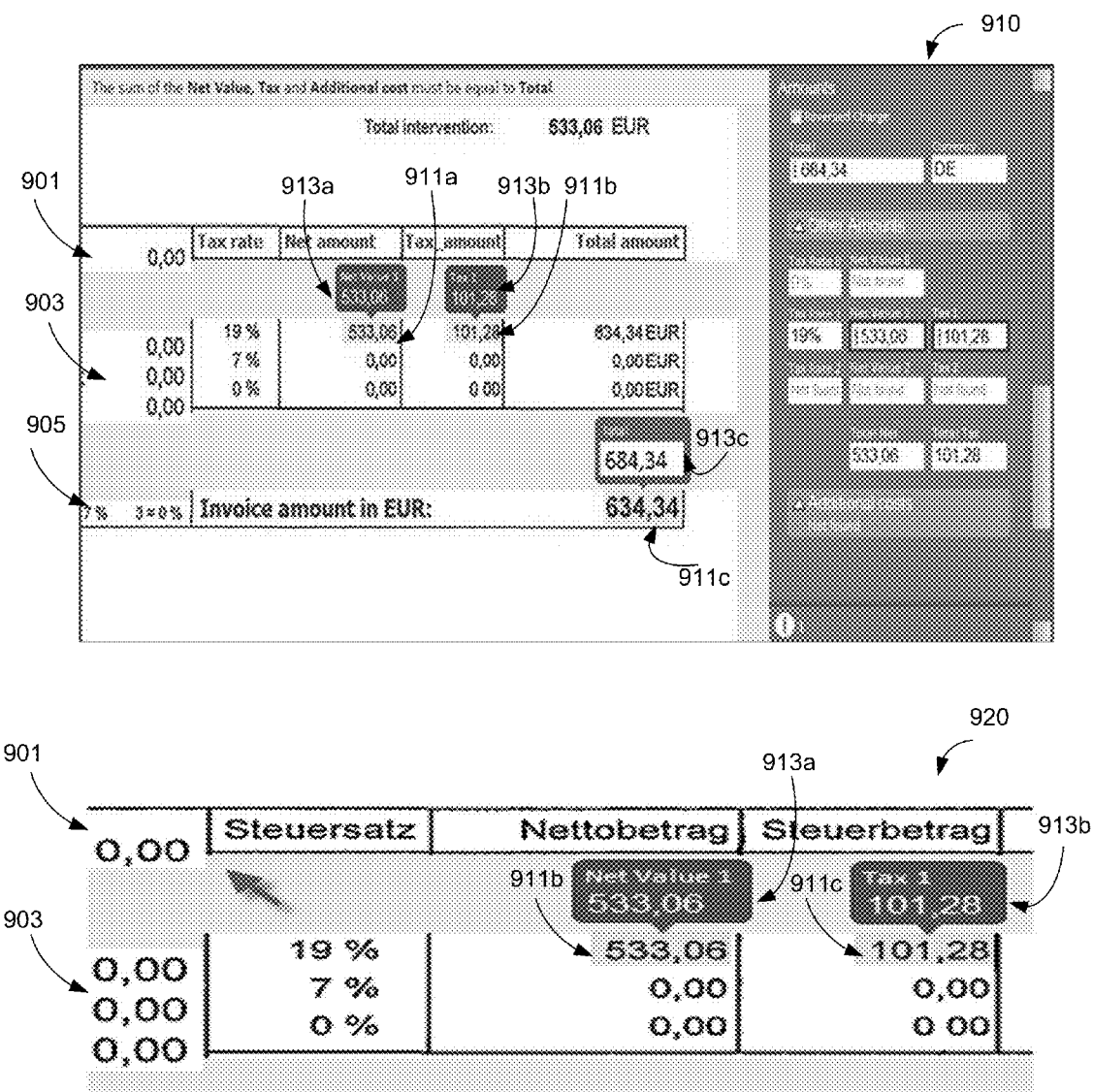
FIG. 9 illustrates examples of user interfaces for data verification according to embodiments of the disclosure.

In yet another more particular example, the processing device can identify multiple image regions containing related data. The processing device then determines whether the related data is recognized correctly based on one or more predetermined computer- or human-implemented rules. More particularly, for example, application 190 determines that the data is recognized correctly in response to determining that the data can be combined according to one or more known formulas. In a more particular example, as illustrated in FIG. 9, application 190 identifies image regions 911a-d as containing related data upon determining that image regions 911a-d correspond to "tax rate," "net amount," "tax amount," and "invoice amount in EUR," respectively. Application 190 then determines whether data extracted from image regions 911a-d comply with one or more predetermined computer-implemented rules. More particularly, for example, application 190 determines whether the data extracted from image regions 911a-c can be combined according to one or more formulas (e.g., "net amount"+"tax rate"×"net amount"="invoice amount," "tax rate"×"net amount"="tax-amount," etc.). In response to determining that a combination of the data does not comply with one or more of the formulas, application 190 can identify one or more of the image regions as corresponding to data to be verified.

In some implementations, application 190 may prompt a user to identify one or more image regions of the image corresponding to data to be verified (e.g., by presenting one or more suitable user interfaces).

Figure 7:
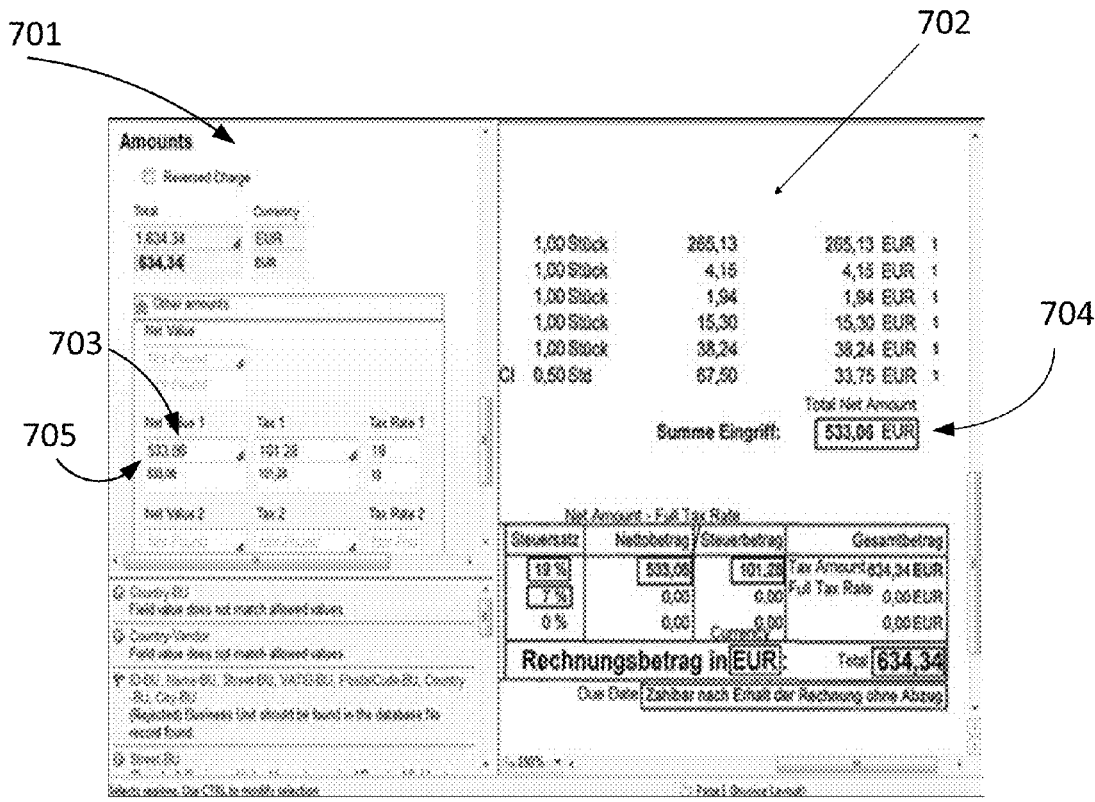
FIG. 7 illustrates examples of user interfaces for data verification according to embodiments of the disclosure.
Figure 7:
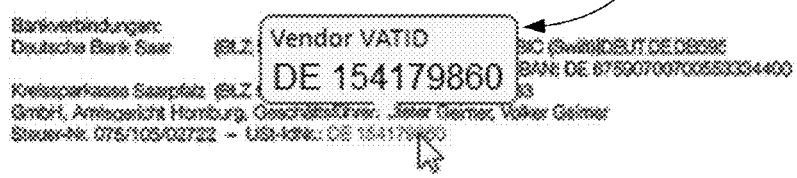

Application 190 may present one or more portions of the image in association with data extracted from the image using one or more suitable user interfaces. An example of a user interface 700 for data verification is shown in FIG. 7. As illustrated, user interface 700 includes a display area 701 for presenting data recognized from an image 702. For example, display area 701 includes a display field 703 for presenting a value of data recognized from an image region 704 of image 702. Display field 705 may include original data from image region 704. Display field 703 may be positioned above, below, next to, etc. display field 705. A user can compare the value displayed in the display field 703 to the original data shown in display field 705. The user may confirm the correctness of the value by pressing a single key or correct the erroneously recognized value.

A display field for presenting a value of data recognized from one or more image regions can be and/or include one or more semi-transparent tags 706 that could be placed above the image. In one implementation, application 190 may provide a user with an option for the tags to turn semi-transparent once the mouse hovers over the corresponding original image.

In some implementations, upon identifying one or more image regions corresponding to data to be verified by a user, application 190 may partition the image into multiple segments (also referred to herein as "image segments") for presentation of data corresponding to the identified image regions for verification. "Identifying image region for verification" refers to the process of identifying extracted data to be verified and determining the corresponding image region for this data. In one implementation, the image segments correspond to constituent portions of the image.

Application 190 partitions the image based on positional information related to the identified image regions and/or other image regions recognized in the image, positioning information related to geometric structures (e.g., dividing lines, tabular structures, etc.) in the image, and/or any other suitable information.

Application 190 may partition the image by generating one or more slicing lines that divide the image into multiple segments. In an example, one or more of the slicing lines may be parallel to a first direction (e.g., a horizontal direction, a vertical direction, or any other direction) or a second direction (e.g., a direction that is perpendicular to the first direction). One or more of the slicing lines may be generated based on positioning information related to an image region that corresponds to data to be verified. One or more of the slicing lines may be generated based on positioning information related to one or more dividing lines positioned between two or more image regions in the image (e.g., a line in the image that is recognized using an OCR technique). Application 190 can partition the image into image segments using any suitable technique or techniques. For example, the image segments may be generated by performing one or more operations described below in connection with FIGS. 2-3C.

In an example, as shown in FIG. 5, an image 500 may be partitioned into image segments 503 and 505 separated by slicing lines 520a-e. Image segment 505 includes an image region 510 corresponding to data to be verified by a user. As illustrated, each of slicing lines 520a-e is parallel to a first direction (e.g., a horizontal direction) or a second direction (e.g., a vertical direction). In some implementations, the second direction is perpendicular to the first direction. Slicing line 521a may be generated based on a boundary of image region 510 (e.g., the top boundary). More particularly, for example, slicing line 520a may be aligned with the top boundary of image region 510. Slicing lines 520b-e may be determined based on positioning information related to geometric structures (e.g., dividing lines, tables, etc.) in image 500. For example, slicing lines 520b-e may correspond to dividing lines 531, 533, 535, and 537 shown in the image portion 550, respectively.

Figure 6:
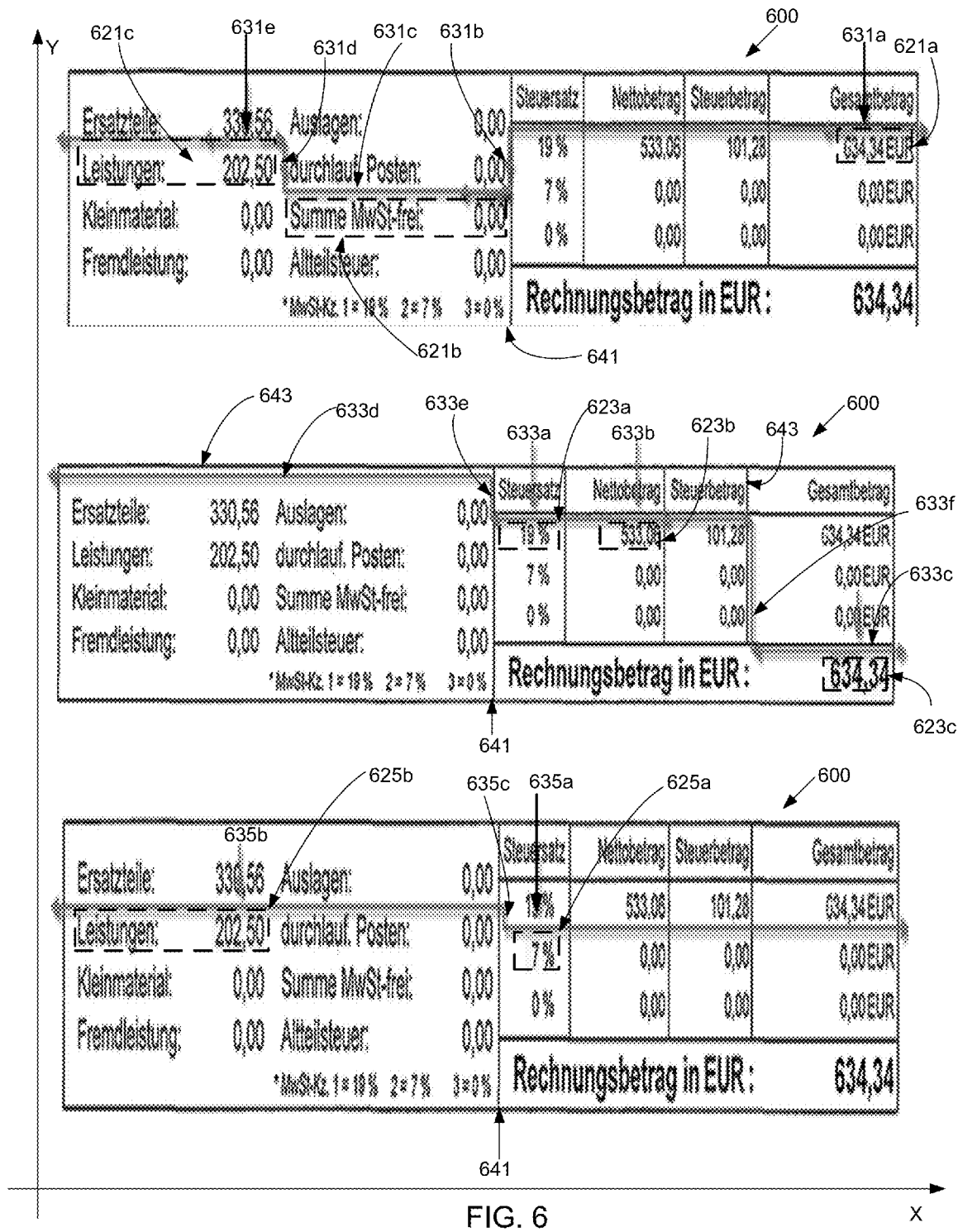
FIG. 6 illustrates examples of images subject to data verification according to another embodiment of the disclosure.

In another example, as shown in FIG. 6, an image 600 may be partitioned into two image segments along slicing lines 631a-e to present data extracted from image regions 621a-c. As illustrated, slicing lines 631a, 631c, 631d, and 631e correspond to boundaries of image regions 621a, 621b, and 621c. Slicing line 631b corresponds to a dividing line positioned between image regions 621a and 621b.

Application 190 can present the image segments in association with data recognized from the image regions. For example, application 190 presents a value of data extracted from a given image region in a display field positioned above, below, next to, etc. the image region. The display field may be positioned between multiple image segments. In some implementations, the display field does not overlap the image segments.

Figure 8:
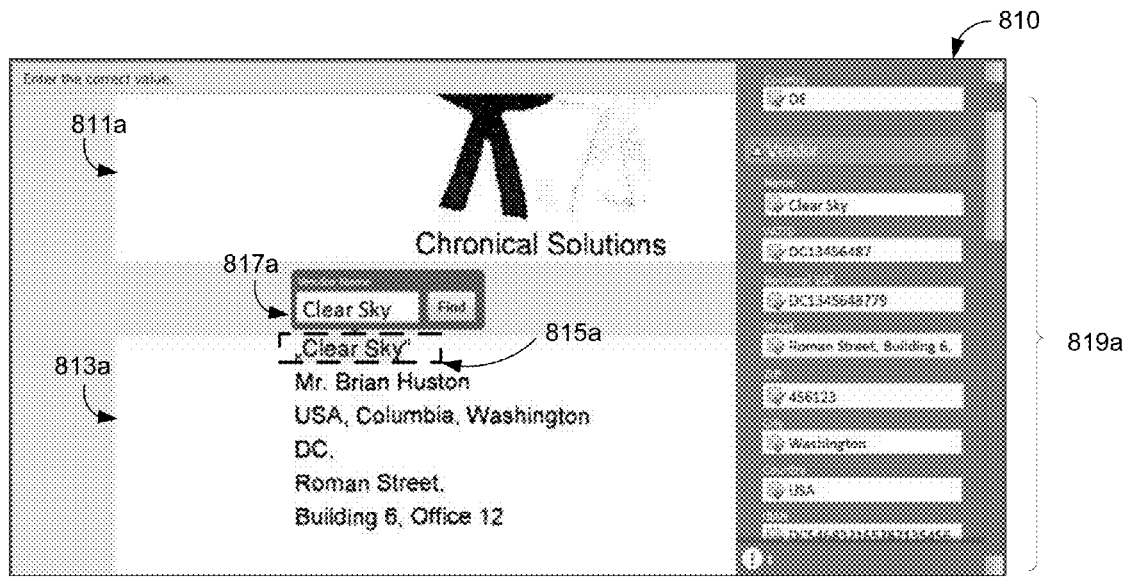
FIG. 8 illustrates examples of user interfaces for data verification according to embodiments of the disclosure.
Figure 8:
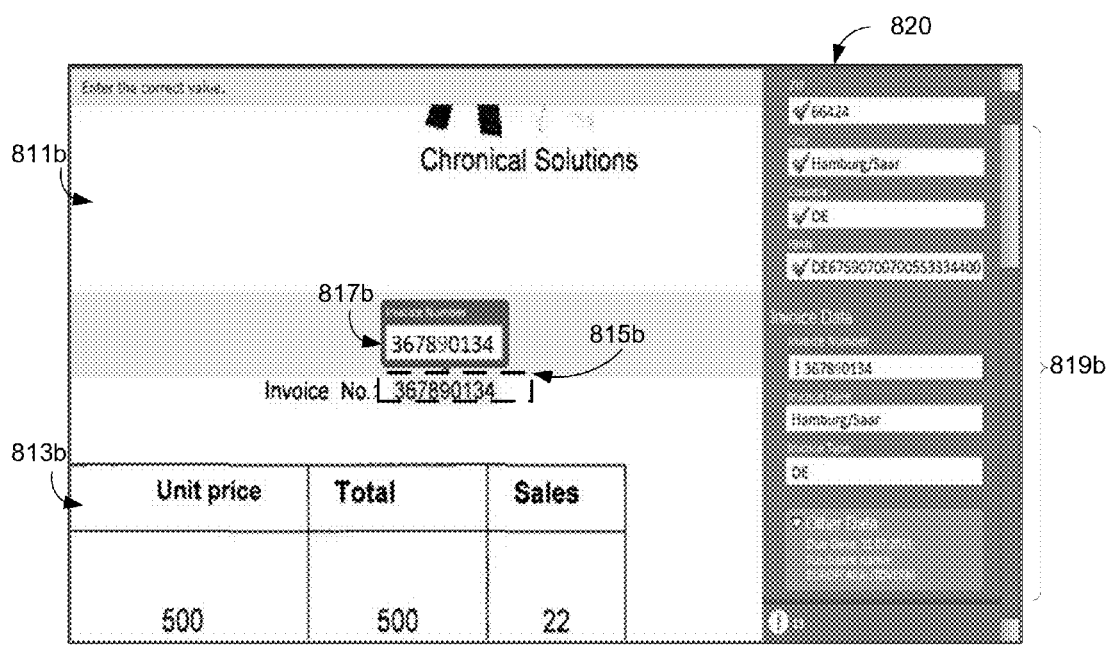

In a more particular example, as illustrated in FIG. 8, user interfaces 810 and/or 820 may be used for presentation of recognized data for data verification. User interface 810, 820 includes an image segment 811a-b, an image segment 813a-b including an image region 815a-b, a display field 817a-b, and text fields 819a-b. Text fields 819a-b are illustrative and may be not included in the user interfaces 810 and/or 820. Application 190 presents a value of data extracted from image region 815a-b in the display field 817a-b and/or one or more text fields 819a-b. In some implementations, display fields 817a-b and/or text fields 819a-b are editable. A user may enter a value of the data contained in image regions 815a-b in display fields 817a-b and/or text fields 819a-b.

In another more particular example, user interfaces 910 and/or 920 of FIG. 9 may be used to present recognized data for verification. As illustrated, one or more portions of image segments 901, 903, and 905 may be presented in association with display fields 913a-c. Each of display fields 913a-c includes a value of data extracted from an image region 911a-c, respectively. Each of display fields 913a-c can be positioned above its corresponding image region for data verification. In some implementations, display fields 913a-c do not overlap image regions 911a-c.

Figure 2:
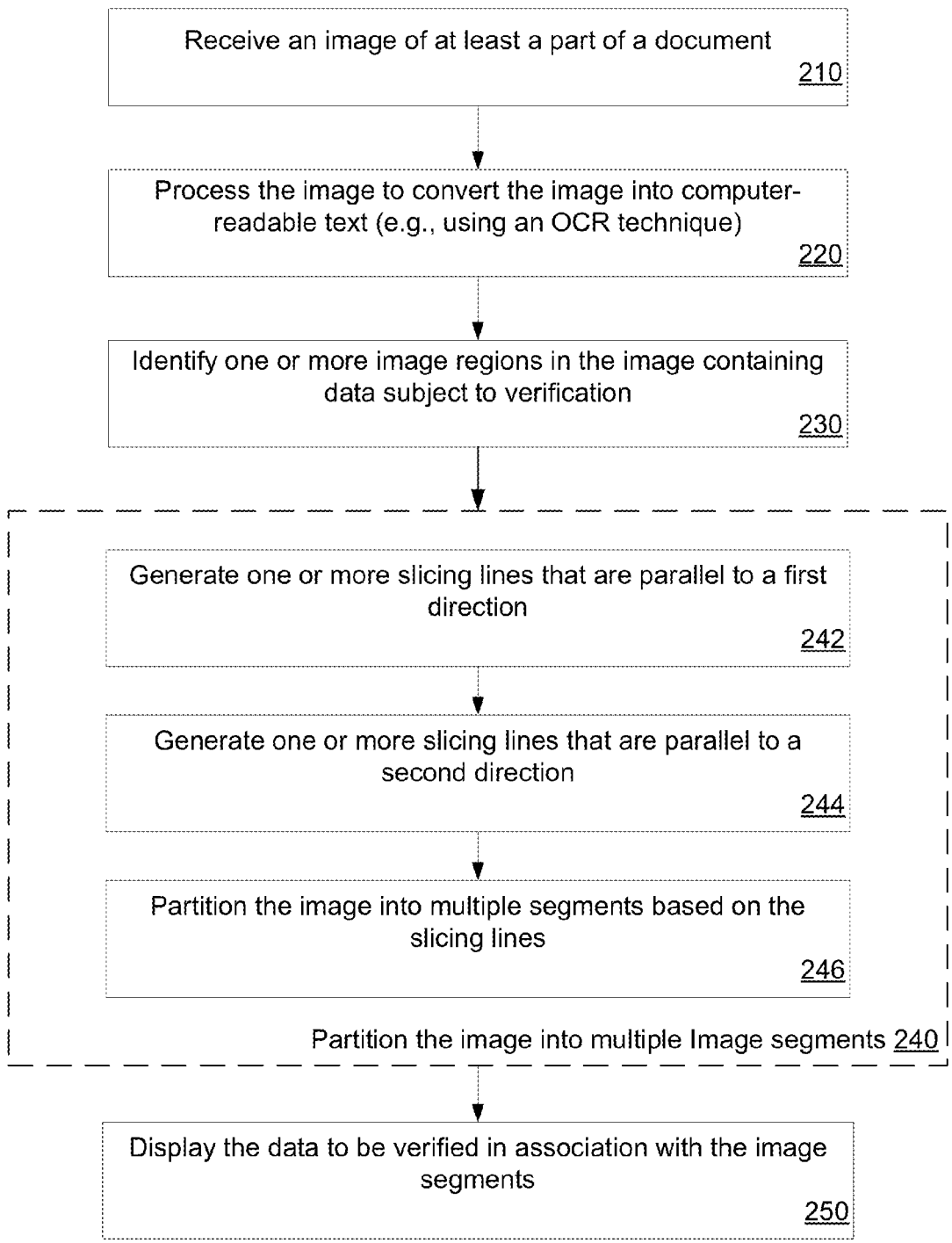
FIG. 2 is a flow diagram illustrating a method for data verification according to an embodiment of the disclosure.

FIG. 2 is a flow diagram illustrating a method 200 for data verification according to an embodiment of the disclosure. Method 200 and/or each of its individual functions, routines, subroutines, or operations may be performed by one or more processing devices of a computer system (e.g., computing device 100 of FIG. 1) executing the method. In some embodiments, method 200 may be performed by a single processing thread. Alternatively, method 200 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

Method 200 begins at block 210 where a processing device receives an image of at least a part of a document (e.g., a document page). In an example, the image may be acquired via an optical input device 130 of the processing device 100 as described above in connection with FIG. 1.

At block 220, the processing device can process the image to convert it into computer-readable text. Before converting the image into computer-readable form various image pre-processing techniques may be performed (e.g. eliminating distortions, perspective alignment etc.) For example, the processing device can process the image using OCR and/or any other suitable techniques to extract sequences of characters and/or any other data from the image. Various document analysis techniques can be used to identify document layout elements, such as logic structure of document, text blocks, image blocks, separators, etc. Recognized data may be processed by any known methods to associate sequence of characters containing numerical or textual data with a sequence of characters containing a description of numerical or textual data. In a more particular example, as described above in connection with FIG. 1, the processing device detects one or more image regions containing sequences of characters using an OCR technique and recognizes the sequences of characters. Additionally, the processing device can associate each of the sequences of characters with one or more data types, such as "character string," "numerical data," "integer," "decimal," etc.

As another example, the processing device can determine positional information related to the image regions and geometric structures (e.g., dividing lines, tables or any other tabular structures, etc.) in the image. In one embodiment, positional information related to an image region or a geometric structure in the image includes one or more sets of coordinates related to the image region or geometric structure.

At block 230, the processing device can identify one or more regions of the image (e.g., "image regions") containing (corresponding to) data to be verified. In one example, the processing device determines that an image region corresponds to data to be verified based on a confidence score indicative of a degree of certainty or uncertainty with respect to the correctness of the data extracted from the image region. In another example, application 190 determines that an image region corresponds to data to be verified in response to detecting one or more errors with respect to the data extracted from the image region. In a more particular example, the image region corresponds to one or more symbols, characters, or any other type of data that cannot be recognized and/or that cannot be recognized with a threshold certainty by the processing device.

At block 240, the processing device can partition the image into multiple image segments. In some implementations, the image segments correspond to constituent portions of the image. One or more of the image segments contain the identified image regions corresponding to data that should be verified. The image can be partitioned based on any suitable information, such as positioning information related to the identified image regions, positioning information related to the geometric structures of the image, etc.

The processing device may partition the image using any suitable technique or combination of techniques. For example, the processing device may partition the image by performing on or more operations described in connection with blocks 242-246 and/or FIGS. 3A-3C. In some implementations, the processing device partitions the image into image segments using multiple techniques and then partitions the image into the minimal number of segments, as will be discussed in more detail below.

At block 242, the processing device can generate one or more slicing lines that are parallel to a first direction. The first direction can be a horizontal direction, a vertical direction, or any other direction. For example, a slicing line can be generated based on positioning information related to the image region, such as one or more coordinates associated with the image region. In a more particular example, as shown in FIG. 5, slicing line 520a may be generated base on a coordinate associated with image region 510 (e.g., the y-coordinate associated with the upper boundary of image region 510). In another more particular example, as shown in FIG. 6, slicing lines 631a, 631c, and 631e may be generated based on coordinates associated with vertices of image regions 621a, 621b, and 621c, respectively.

As another example, a slicing line can be generated based on positioning information related to a dividing line positioned between two image regions (e.g., two image regions identified at 230). In a more particular example, as illustrated in FIG. 6, a slicing line 633f may be generated based on a vertical dividing line 643 positioned between image regions 623b and 623c.

At block 244, the processing device generates one or more slicing lines parallel to a second direction. The second direction is perpendicular to the first direction in some implementations. In one example, the processing device may detect a dividing line parallel to the second direction of the coordinate system between two image regions detected at 230. The processing device then generates a slicing line based on the detected dividing line. In a more particular example, as illustrated in FIG. 5, slicing lines 520b and 520c may be generated based on vertical dividing lines 531 and 533 (shown in image portion 550), respectively. In another more particular example, as shown in FIG. 6, a slicing line 631b may be generated based on a dividing line 641 positioned between image regions 621a and 621b.

In another example, the processing device may generate a slicing line based on positioning information related to two or more image regions that correspond to data to be verified. In a more particular example, as shown in FIG. 6, a slicing line 631d is generated based on positioning information related to image regions 621b and 621c. More particularly, for example, slicing line 631d can be generated based on coordinates associated with image region 621c and image region 621b.

At block 246, the processing device can partition the image into multiple segments based on the slicing lines. For example, the processing device generates two image segments along one or more slicing lines between the two image segments. In a more particular example, as illustrated in FIG. 5, image 500 may be partitioned into image segments 503 and 505 along slicing lines 520a-e.

At block 250, the processing device can present the image segments in association with the data to be verified. For example, the processing device presents a display field including a value of data extracted from a given image region and an image segment including the image region. The display field may be positioned between multiple image regions. In some implementations, the display field and the image regions do not overlap. As another example, the processing device presents multiple display fields including values of data extracted from multiple image regions for verification in a user interface. Each of the display fields may include a value of data extracted from one of the image regions and can be positioned above a portion of an image segment including its corresponding image region. The image segments and the data to be verified can be presented using one or more techniques described above in connection with FIGS. 1 and 7-9.

Figure 3A:
FIG. 3A is a flow diagram illustrating methods for image segmentation according to embodiments of the disclosure.
Figure 3B:
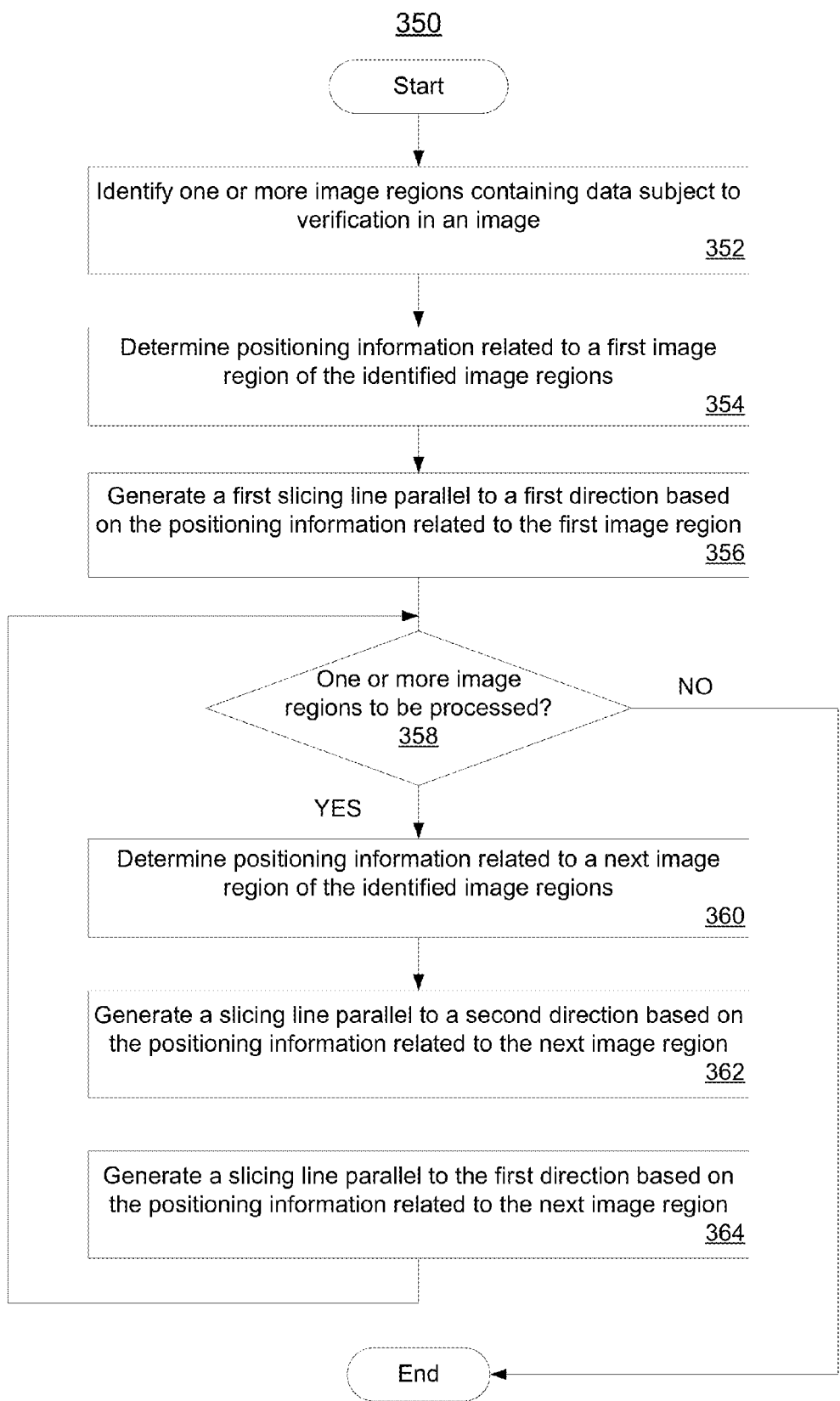
FIG. 3B is a flow diagram illustrating methods for image segmentation according to embodiments of the disclosure.
Figure 3C:
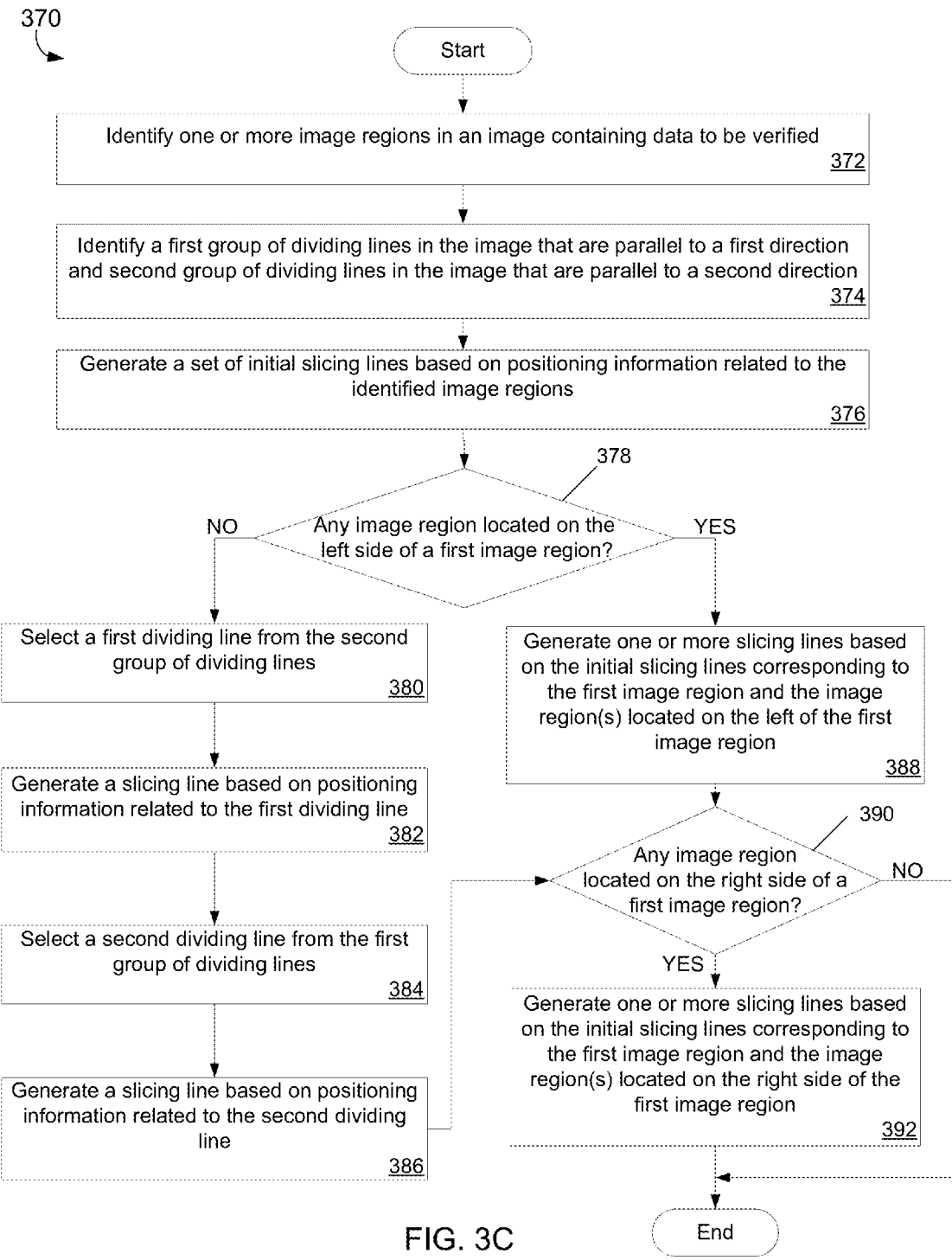
FIG. 3C is a flow diagrams illustrating methods for image segmentation according to embodiments of the disclosure.

FIGS. 3A, 3B, and 3C are flow diagrams illustrating methods 310, 350, and 370 for image segmentation for data verification according to some implementations of the disclosure. More particularly, these embodiments relate to cases, when there are multiple image regions corresponding to extracted data to be verified. This extracted data may be combined by one of verification rules. Methods 310, 350, and 370 and/or each of their individual functions, routines, subroutines, or operations may be performed by one or more processing devices of a computer system (e.g., computing device 100 of FIG. 1) executing the method. In some embodiments, methods 310, 350, and 370 may be performed by a single processing thread. Alternatively, methods 310, 350, and 370 may be performed by two or more processing threads, each thread executing one or more individual functions, routines, subroutines, or operations of the method. In an illustrative example, the processing threads implementing methods 310, 350, and 370 may be synchronized (e.g., using semaphores, critical sections, and/or other thread synchronization mechanisms). Alternatively, the processing threads implementing methods 310, 350, and 370 may be executed asynchronously with respect to each other.

At block 312, a processing device can identify an image region corresponding to data to be verified in an image. For example, the image region can be identified as described above in connection with block 230 of FIG. 2. In one example, as illustrated in FIG. 5, the processing device detects an error related to data extracted from image region 510 (e.g., a symbol ":" that cannot be recognized by the processing device or that cannot be recognized with a threshold degree of uncertainty). The processing device then identifies image region 510 as corresponding to data to be verified.

At block 314, the processing device can determine positioning information related to the image region. The positioning information can be determined using an OCR technique and/or any other image processing technique or combination of techniques. The positioning information can include any suitable information that can be used to define the location of the image region. For example, the positioning information includes information related to boundaries of the image region determined using an OCR technique, an edge detection technique, and/or any other image processing technique. Boundaries may be determined based on coordinates of corresponding recognized characters. As another example, the processing device determines one or more coordinates associated with the image region, such as coordinates associated with vertices of the image region, coordinates associated with boundaries of the image region, etc.

At block 316, the processing device generates a slicing line parallel to a first direction (e.g., a horizontal direction, a vertical direction, or any other direction). The slicing line may be generated based on the positioning information related to the image region. For example, the processing device generates a slicing line that is aligned with a boundary of the image region (e.g., the top boundary, the bottom boundary, the left boundary, the right boundary, etc.). In a more particular example, as shown in FIG. 5, a slicing line 520a may be determined as the first slicing line for partitioning image 500 in some implementations. Slicing line 520a may be positioned above or below the top boundary of image region 510. Alternatively, slicing line 520a may be and/or includes one or more portions of the top boundary of image region 510. While the first slicing line is determined based on the top boundary of image region 510, this is merely illustrative. Any positioning information related to any portion of the image region may be used to determine the first slicing line.

At block 318, the processing device can identify a first group of dividing lines in the image that are parallel to the first direction. Additionally or alternatively, the processing device can identify a second group of dividing lines in the image that are parallel to a second direction. The first group of dividing lines and the second group of dividing lines may be detected using an OCR technique, an edge detection technique, and/or any other suitable technique or combination of techniques. In one implementation, the first direction is perpendicular to the second direction. In a more particular example, the first group of dividing lines may include one or more horizontal dividing lines in the image (e.g., dividing lines 535, 537 and any other horizontal dividing lines as shown in FIG. 5). In another more particular example, the second group of dividing lines may include one or more vertical dividing lines in the image (e.g., dividing lines 531, 533 and any other vertical dividing lines as shown in FIG. 5).

At block 320, the processing device can select a first dividing line and a second dividing line from the second group of dividing lines. This selection may be made based on the positioning information related to the image region. For example, the first dividing line may be a dividing line of the second group of dividing lines that is positioned closer to a first boundary of the image region (e.g., the left boundary, the right boundary, etc.) than the other dividing lines of the second group of dividing lines. The second dividing line may be a dividing line of the second group of dividing lines that is positioned closer to a second boundary of the image region (e.g., the boundary that is opposite to the first boundary) than the other dividing lines of the second group of dividing lines. In a more particular example, the dividing line 531 of FIG. 5 may be selected as a vertical dividing line that is closest to the left boundary of image region 510. In another more particular example, the dividing line 533 of FIG. 5 may be selected as a vertical dividing line that is closest to the right boundary of image region 510. In some implementations, any other dividing line in the image can be selected as the first dividing line or the second dividing line.

At block 322, the processing device can generate one or more slicing lines based on positioning information related to the first dividing line and/or the second dividing line. The slicing line(s) may be parallel to the second direction. In one example, the processing device generates a slicing line that is aligned with one or more portions of the first dividing line. In another example, the processing device generates a slicing line that is aligned with one or more portions of the second dividing line. In a more particular example, a slicing line 520b can be aligned with dividing line 531. In one implementation, slicing line 520b may be positioned on the right side or the left side of dividing line 531. In another implementation, slicing line 520b may be and/or include one or more portions of dividing line 531. Similarly, a slicing line 520c can be aligned with dividing line 533.

At block 324, the processing device can select a third dividing line from the first group of dividing lines based on the positioning information related to the first dividing line. For example, the processing device selects a dividing line from the first group of dividing lines that crosses the first dividing line. In a more particular example, the processing device identifies multiple dividing lines of the first group of dividing lines that cross the first dividing line. The processing device then selects one of the multiple dividing lines that is closest to the first slicing line. Alternatively, the processing device can select any other dividing line from the first group of dividing lines as the third dividing line.

As another example, the processing device determines that the first dividing line is a part of a tabular structure in the image. The processing device then selects a dividing line in the tabular structure as being the third dividing line. In a more particular example, as illustrated in FIG. 5, the processing device determines that dividing line 535 is a part of a tabular structure in the image. The processing device then detects a dividing line of the tabular structure that has the first direction and that is closest to the first slicing line as being the third dividing line.

At block 326, the processing device can generate a slicing line based on positioning information related to the third dividing line. The slicing line may be parallel to the first direction. The slicing line may be aligned with the third dividing line. In one example, the slicing line may be positioned above or below the third dividing line. In another example, the slicing line may be and/or include one or more portions of the third dividing line. In a more particular example, as illustrated in FIG. 5, a slicing line 520d may be determined based on positioning information related to dividing line 535.

At block 328, the processing device can select a fourth dividing line from the first group of dividing lines based on positioning information related to the second dividing line. For example, the processing device selects a dividing line from the first group of dividing lines that crosses the second dividing line. In a more particular example, the processing device identifies multiple dividing lines of the first group of dividing lines that cross the second dividing line. The processing device then selects one of the multiple dividing lines that is closest to the second slicing line. As another example, the processing device determines that the second dividing line is a part of a table in the image. The processing device then selects a dividing line in the table that is closest to the second dividing line as being the fourth dividing line. In a more particular example, a dividing line 537 of FIG. 5 may be selected based on positioning information related to dividing line 533.

At block 330, the processing device can generate a slicing line based on positioning information related to the fourth dividing line. For example, the processing device generates the slicing line that is parallel to the first direction. The slicing line may be aligned with the fourth dividing line. In one example, the slicing line may be positioned above or below the fourth dividing line. In another example, the slicing line may be and/or include one or more portions of the fourth dividing line. In a more particular example, as illustrated in FIG. 5, a slicing line 520e may be determined based on positioning information related to dividing line 537.

Turning to FIG. 3B, process 350 may start at block 352 when a processing device identifies one or more image regions in an image corresponding to data to be verified. For example, the image regions can be identified as described above in connection with block 230 of FIG. 2. In a more particular example, the processing device processes an image of 600 of FIG. 6 and identifies image regions 621a-c corresponding to data to be verified.

At block 354, the processing device can determine positioning information related to a first image region of the identified image regions. The first image region may be the rightmost image region, the leftmost image region, the uppermost image region, a random image region, and/or any other image region identified at 352. In one example, the processing device may determine one or more coordinates associated with the first image region. In a more particular example, the processing device determines one or more coordinates associated with image 621a of FIG. 6, such as one or more coordinates associated with the upper-right corner of image region 621a (e.g., an x-coordinate, a y-coordinate, etc.).

At block 356, the processing device can generate a first slicing line parallel to a first direction based on the positioning information related to the first image region. The first direction may be a horizontal direction, a vertical direction, or any other direction. In one example, the processing device determines the first slicing line based on one or more coordinates associated with first image region. In a more particular example, as shown in FIG. 6A, a horizontal slicing line 631a may be determined based on a y-coordinate associated with the upper boundary or upper-right corner of image region 621a.

At block 358, the processing device can determine whether at least one image region corresponding to data to be verified is to be processed for partitioning the image into image segments. In response to determining that no image region is to be processed, the processing device can end process 350.

Alternatively, in response to determining that one or more image regions are to be processed, the processing device proceeds to block 360 and determines positioning information related to a next image region of the identified image regions. For example, the processing device determines one or more coordinates associated with the next image region. In a more particular example, one or more coordinates associated with image region 621b of FIG. 6A can be determined.

At 362, the processing device can generate a slicing line parallel to a second direction based on the positioning information related to the next image region. The second direction is perpendicular to the first direction in some implementations. In one example, the processing device may generate the slicing line based on one or more coordinates associated with the next image region. In a more particular example, as illustrated in FIG. 6, the processing device generates a vertical slicing line 631b based on a coordinate (e.g., an x-coordinate) associate with the upper-right corner or top boundary of image region 621b. In one example, slicing line 631b may be positioned above image region 621b. In another example, slicing line 631b may be and/or includes one or more portions of image region 621b (e.g., the right boundary of image region 621b).

At 364, the processing device can determine a slicing line parallel to the first direction based on the positioning information related to the next image region. In one example, the processing device may generate the slicing line based on one or more coordinates associated with the next image region. In a more particular example, as shown in FIG. 6, a horizontal slicing line 631c may be determined based on a y-coordinate associated with the upper boundary or upper-right corner of image region 621b.

Upon performing operation 364, the processing device may return to block 358 and determine whether one or more image regions corresponding to data to be verified is to be processed. In response to determining that no image regions corresponding to data to be verified is to be processed, the processing device may end process 350.

Alternatively, in response to determining that one or more image regions are to be processed, the processing device may generate one or more slicing lines by performing operations described in connection with blocks 360-364. For example, upon generating slicing lines 621b-c, the processing device determines positioning information related to a next image region in image 600 (e.g., image region 621c). More particularly, for example, the processing device determines one or more coordinates associated with image region 621c, such as one or more coordinates associated the upper-right corner and/or upper boundary of image region 621c. The processing device then determines a slicing line having the second direction based on the positioning information related to image region 621c. More particularly, for example, the processing device determines a slicing line 631d based on a coordinate associated with image region 621c (e.g., an x-coordinate associated with the upper-right corner of image region 621c). Additionally, the processing may determine a slicing line having the first direction based on the positioning information related to image region 621c. More particularly, for example, the processing device determines a slicing line 631e based on a coordinate associated with image region 621c (e.g., a y-coordinate associated with the upper-right corner of image region 621c).

Turning to FIG. 3C, method 370 may start at block 372 where the processing device identifies one or more image regions that correspond to data to be verified. For example, the image regions can be identified as described above in connection with block 230 of FIG. 2. In a more particular example, as illustrated in FIG. 6, the processing device processes an image 699 and identifies image regions 623a-c as corresponding to data to be verified. In another more particular example, image regions 635a-b of FIG. 6 can be identified as image regions that correspond to data to be verified.

At block 374, the processing device identifies a first group of dividing lines in the image that are parallel to a first direction. Additionally or alternatively, the processing device can identify a second group of dividing lines in the image that are parallel to a second direction. In some implementations, the first direction is perpendicular to the second direction.

At block 376, the processing device generates a set of initial slicing lines for the identified image regions. The initial slicing lines may be parallel to a first direction, such as a horizontal direction, a vertical direction, or any other direction. In one example, for a given image region, the processing device generates a slicing line parallel to the first direction based on one or more coordinates associated with the image region, such as a y-coordinate associated with the upper boundary of the image region. In a more particular example, as illustrated in FIG. 6, slicing lines 633a-c may be generated for image regions 623a-c, respectively. In another more particular example, as illustrated in FIG. 6, slicing lines 635a-b can be generated for image regions 625a-b, respectively.

At block 378, the processing device determines whether any image region identified at 372 is located on the left side of a first image region of the image regions identified at 372. The first image region may be any image region that is identified at 372. In one example, the image includes multiple tabular structures. The first image region may be an image region located in one of the tabular structures (e.g., the leftmost image region of the rightmost tabular structure in the image, the rightmost image region of the leftmost tabular structure in the image, or any image region).

In response to determining that no image region corresponding to data to be verified is located on the left side of the first image region, the processing device proceeds to 380 and selects a first dividing line from the second group of dividing lines. The selection can be made based on any criterion or criteria. In some implementations, the processing device selects a dividing line that is closer to the left boundary of the first image region than any other dividing line of the second group of dividing lines. In a more particular example, as illustrated in FIG. 6, upon generating slicing line 633a, the processing device determines that no image region corresponding to data to be verified is located on the left of the side of the image region 633a. The processing device then selects a dividing line 641 as the vertical dividing line closest to the left boundary of image region 633a.

At block 382, the processing device generates a slicing line based on positioning information related to the first dividing line. The slicing line may be parallel to the second direction. In one example, the processing device generates a slicing line that is aligned with one or more portions of the first dividing line. In a more particular example, a slicing line 633e can be generated based on positioning information related to dividing line 641. In one implementation, slicing line 633e may be aligned with dividing line 641.

At 384, the processing device selects a second dividing line from the first group of dividing lines. For example, the processing device selects a dividing line from the first group of dividing lines that crosses the first dividing line. In a more particular example, the processing device identifies multiple dividing lines of the first group of dividing lines that cross the first dividing line. The processing device then selects one of the multiple dividing lines that is closest to the first slicing line. In another more particular example, the processing device determines that the first dividing line is a part of a tabular structure. The processing device then selects a dividing line in the tabular structure as being the third dividing line.

At 386, the processing device generates a slicing line based on the second dividing line. The slicing line may be parallel to the first direction. The slicing line may be aligned with the second dividing line. In one example, the slicing line may be positioned above or below the second dividing line. In another example, the slicing line may be and/or include one or more portions of the second dividing line. In a more particular example, as illustrated in FIG. 6, a slicing line 633d may be determined based on positioning information related to dividing line 643.

In response to determining that there is one or more image regions corresponding to data to be verified located on the left side of the first image region, the processing device proceeds to block 388 and generates one or more slicing lines based on the initial slicing lines corresponding to the first image region and the image region(s) located on the left of the first image region. For example, the processing device may determine that two initial slicing lines are associated with a same coordinate (e.g., an x-coordinate, a y-coordinate, etc.) and may then generate a slicing line by connecting the two initial slicing lines. As another example, the processing device may generate a slicing line having the second direction to connect two initial slicing lines. In a more particular example, the slicing line may be aligned with a dividing line located between two initial slicing lines. In another more particular example, the slicing line may be aligned with a boundary of an image region (e.g., an image region positioned above the first image region, the first image region, an image region corresponding to data to be verified, etc.). As illustrated in FIG. 6, a slicing line 635c may be generated to connect initial slicing lines 635a and 635b.

At block 390, the processing device determines whether any image region identified at 372 is located on the right side of the first image region. In response to determining that no image region identified at 372 is located on the right side of the first image region, process 370 may conclude.

In response to determining that one or more image regions identified at 372 are located on the right side of the first image region, the processing device can proceeds to block 392 and generates one or more slicing lines based on the initial slicing lines corresponding to the first image region and the image region(s) located on the right of the first image region. For example, the processing device may determine that two initial slicing lines are associated with a same coordinate and may then generate a slicing line by connecting the two initial slicing lines. In a more particular example, as illustrated in FIG. 6, the processing device determines that initial slicing lines 633a and 633b are associated with the same y-coordinate. The processing device then generates a slicing line by connecting initial slicing lines 633a and 633b.

As another example, the processing device may generate a slicing line having the second direction to connect two initial slicing lines. In a more particular example, the slicing line may be aligned with a dividing line located between two initial slicing lines. In another more particular example, the slicing line may be aligned with a boundary of an image region (e.g., an image region positioned above the first image region, the first image region, an image region corresponding to data to be verified, etc.). As illustrated in FIG. 6, a vertical slicing line 633e may be generated to connect initial slicing lines 633b and 633c. Slicing line 633f may be aligned with a vertical dividing line positioned between initial lines 633b and 633c.

Figure 10:
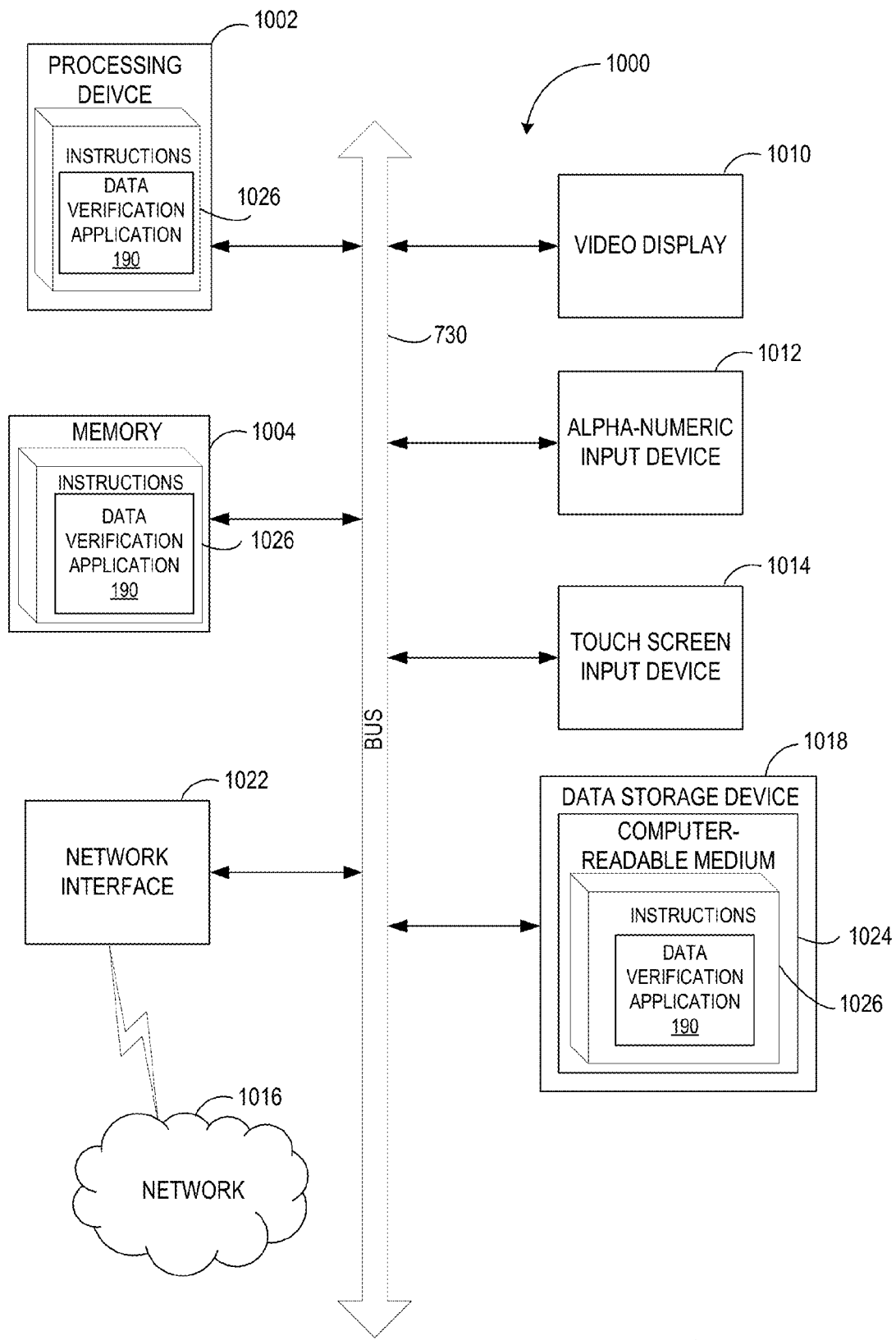
FIG. 10 illustrates a block diagram of one embodiment of a computer system.

FIG. 10 illustrates a diagrammatic representation of a machine in the example form of a computer system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1000 includes a processing device 1002 (e.g., processor, CPU, etc.), a main memory 1004 (e.g., read-only memory (ROM), flash memory, dynamic random access memory (DRAM) (such as synchronous DRAM (SDRAM) or DRAM (RDRAM), etc.), a static memory 1006 (e.g., flash memory, static random access memory (SRAM), etc.), and a data storage device 1018, which communicate with each other via a bus 1008.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute the processing logic 1026 for performing the operations and steps discussed herein.

The computer system 1000 may further include a network interface device 1022 communicably coupled to a network 1064. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1018 may include a machine-accessible storage medium 1024 on which is stored software 1026 embodying any one or more of the methodologies of functions described herein. The software 1026 may also reside, completely or at least partially, within the main memory 1004 as instructions 1026 and/or within the processing device 1002 as processing logic 1026 during execution thereof by the computer system 1000; the main memory 1004 and the processing device 1002 also constituting machine-accessible storage media.

The machine-readable storage medium 1024 may also be used to store instructions 1026 to process electronic documents for invoice recognition, such as the application 190 as described above with respect to FIG. 1, and/or a software library containing methods that call the above applications. While the machine-accessible storage medium 1024 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "creating," "identifying," "providing," "executing," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method, comprising:
receiving, using a processing device, an image of at least a part of a document;
extracting data from the image of at least the part of the document;
identifying a first image region in the image that corresponds to the extracted data to be verified by a user;
partitioning the image into a plurality of image segments based on positioning information related to the first image region, wherein the plurality of image segments comprises a first image segment and a second image segment, and wherein the second image segment comprises the first image region; and
presenting data extracted from the first image region in association with the first image segment and the second image segment in a user interface.

2. The method of claim 1, wherein presenting the data extracted from the first image region comprises presenting a first value of the data extracted from the first image region in a first display field in the user interface, wherein the first display field is positioned between the first image segment and the second image segment in the user interface.

3. The method of claim 2, wherein the first display field does not overlap the second image segment presented in the user interface.

4. The method of claim 2, wherein the first image segment does not overlap the second image segment.

5. The method of claim 2, further comprising:
identifying a plurality of image regions corresponding to the extracted data to be verified by the user, wherein the plurality of image regions comprises the first image region; and
presenting data extracted from the plurality of image regions in a plurality of display fields in the user interface, wherein the plurality of display fields comprises the first display field, wherein each of the plurality of display fields is positioned above one of the image regions in the user interface.

6. The method of claim 5, wherein the display fields do not overlap the first image segment or the second image segment presented in the user interface.

7. The method of claim 1, wherein partitioning the image into the plurality of segments comprises:
generating a plurality of slicing lines; and
partitioning the image into the plurality of image segments based on the plurality of slicing lines.

8. The method of claim 7, wherein the plurality of slicing lines comprises a first slicing line that is parallel to a first direction and a second slicing line that is parallel to a second direction.

9. The method of claim 8, wherein the first direction is perpendicular to the second direction.

10. The method of claim 8, further comprising generating the first slicing line based on the positioning information related to the first image region.

11. The method of claim 8, further comprising:
identifying a first dividing line in the image; and
generating the second slicing line based on positioning information related to the first dividing line, wherein the first dividing line is parallel to the second direction.

12. The method of claim 11, further comprising:
identifying a second dividing line in the image; and
generating a third slicing line based on positioning information related to the second dividing line, wherein the second dividing line is parallel to the first direction.

13. The method of claim 8, further comprising:
identifying a second image region in the image that corresponds to the extracted data to be verified; and
generating a fourth slicing line parallel to the first direction based on positioning information related to the second image region, wherein the second image segment comprises the second image region.

14. The method of claim 13, further comprising generating a fifth slicing line parallel to the second direction based on the positioning information related to the second image region.

15. The method of claim 13, further comprising presenting a second value of data extracted from the second image region in a second display field of the user interface, wherein the second display field is positioned between the first image segment and the second image segment in the user interface.

16. The method of claim 1, wherein identifying the first image region comprises determining at least one of a confidence score or an error related to the data extracted from the first image region.

17. A system, comprising:
a memory; and
a processing device communicably coupled to the memory to:
receive an image of at least a part of a document;
extract data from the image of at least the part of the document;
identify a first image region in the image that corresponds to the extracted data to be verified by a user;
partition the image into a plurality of image segments based on positioning information related to the first image region, wherein the plurality of image segments comprises a first image segment and a second image segment, and wherein the second image segment comprises the first image region; and
present data extracted from the first image region in association with the first image segment and the second image segment in a user interface.

18. The system of claim 17, wherein to present the data extracted from the first image region, the processing device is further to present a first value of the data extracted from the first image region in a first display field of the user interface, wherein the first display field is positioned between the first image segment and the second image segment in the user interface.

19. The system of claim 18, wherein the first display field does not overlap the second image segment presented in the user interface.

20. A non-transitory machine-readable storage medium including instructions that, when accessed by a processing device, cause the processing device to perform operations comprising:
receiving, using the processing device, an image of at least a part of a document;
extract data from the image of at least the part of the document;
identifying a first image region in the image that corresponds to the extracted data to be verified by a user;
partitioning the image into a plurality of image segments based on positioning information related to the first image region, wherein the plurality of image segments comprises a first image segment and a second image segment, and wherein the second image segment comprises the first image region; and
presenting data extracted from the first image region in association with the first segment and the second segment in a user interface.

* * * * *